Nov. 8, 1966  A. J. WESOLOWSKI  3,284,651
COMPACT INDUCTOR ALTERNATOR
Original Filed Aug. 10, 1962
2 Sheets-Sheet 1
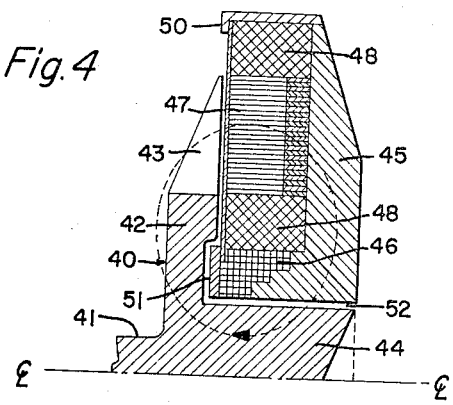
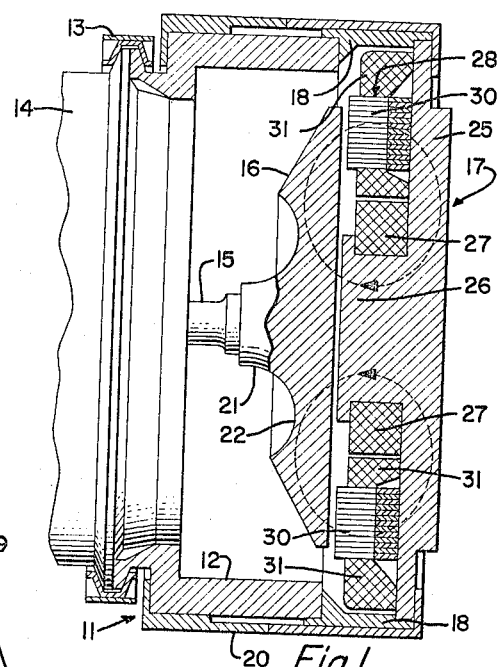
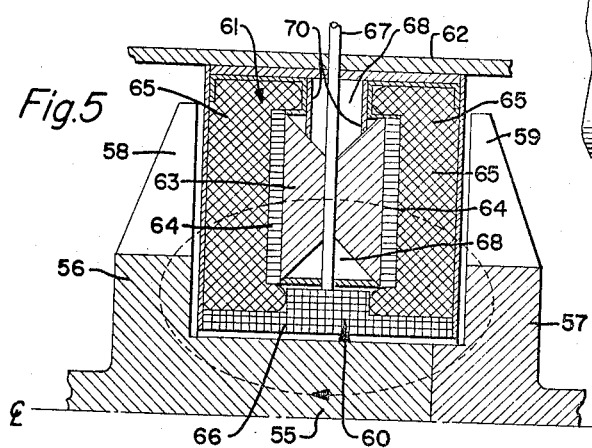
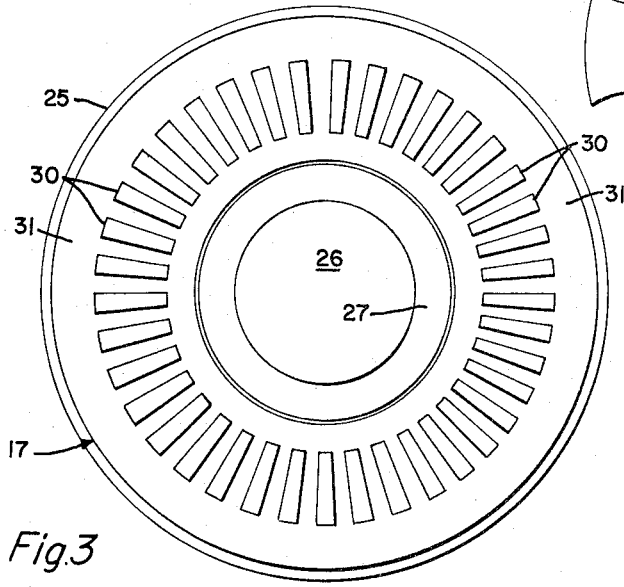
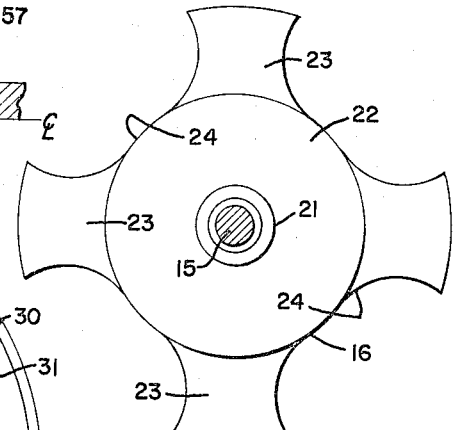
INVENTOR.
ADOLPH J. WESOLOWSKI
BY
Herschel C. Omohundro
ATTORNEY Nov. 8, 1966 A. J. WESOLOWSKI 3,284,651
COMPACT INDUCTOR ALTERNATOR
Original Filed Aug. 10, 1962 2 Sheets-Sheet 2
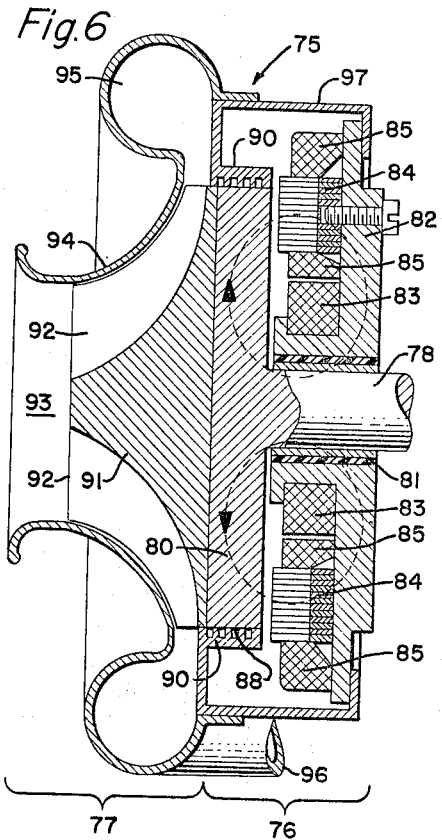
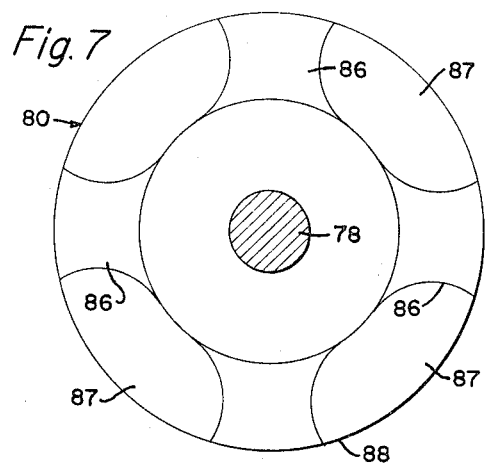
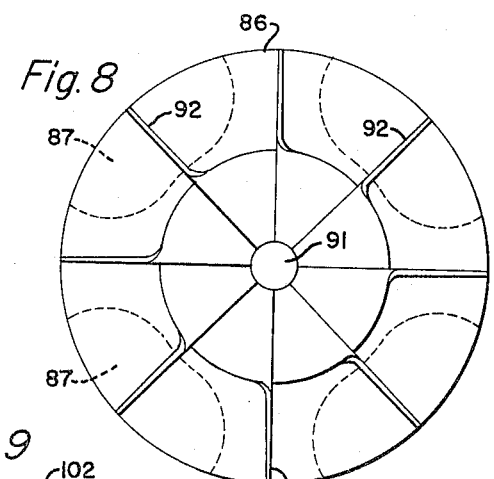
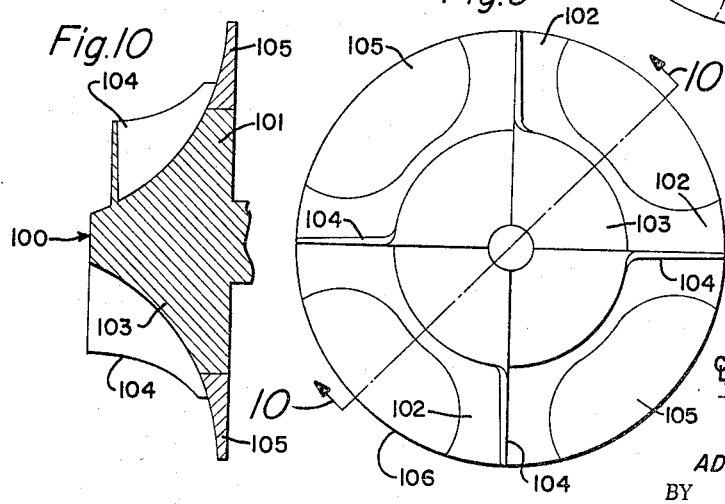
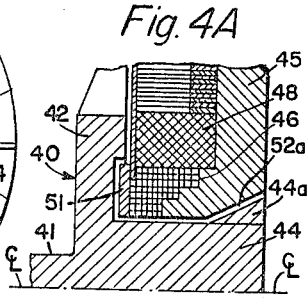
INVENTOR.
ADOLPH J. WESOLOWSKI
BY
Herschel C. Omohundro
ATTORNEY

United States Patent Office 3,284,651
Patented Nov. 8, 1966

3,284,651
COMPACT INDUCTOR ALTERNATOR
Adolph J. Wesolowski, Phoenix, Ariz., assignor to The Garrett Corporation, Los Angeles, Calif., a corporation of California
Original application Aug. 10, 1962, Ser. No. 216,253. Divided and this application Oct. 21, 1965, Ser. No. 499,436
4 Claims. (Cl. 310—168)

This application is a division of patent application Serial No. 216,253, filed August 10, 1962, entitled Compact Inductor Alternator, now Patent No. 3,243,621, issued March 29, 1966.

This invention relates to inductor alternators and more particularly to an efficient and compact homopolar inductor alternator which is especially adapted to be combined and integrated with a turbomachine, such as a turbocompressor.

Recent technological advances in many fields of science have created a need for an efficient, lightweight power generator which can maintain its reliability under severe environmental conditions. Although homopolar inductor alternators have features which make them of general interest in connection with this need, they have been used in the past primarily in applications where weight, size and transient characteristics are not important considerations. The present invention is based on the discovery that it is possible, by reducing magnetic leakage and by the more effective use of materials, to design a compact, efficient, lightweight inductor generator which is particularly adapted for integration with various types of turbomachinery such as the well-known gas turbine now in wide use in the aircraft industry.

It is therefore the principal object of this invention to provide an improved compact inductor alternator which is capable of very high speed operation and has a desirable physical shape so that it is particularly adapted for effective integration with a gas turbine or compressor.

Another object of the invention is to provide an improved inductor alternator which may be combined with a turbomachine, and in which there is a great weight saving and reduction in installation complexity as compared with conventional generators.

A further object of the invention is to provide an inductor alternator in which the stator and the rotor are so arranged that the magnetic flux passes axially through the air gaps and stator and radially through the poles of said rotor whereby the leakage of flux from rotor to stator is substantially reduced.

Still another object of the invention is to provide an inductor alternator in which the field coil is of minimum size and is substantially buried in electrical steel.

It is a further object of this invention to provide a combination alternator and compressor or alternator and turbine wheel which is adapted to operate efficiently at the high-rotational speeds encountered with the usual turbomachinery, thereby eliminating the usual speed changing gear box between the alternator and compressor or turbine.

Another object of the invention is to provide an improved inductor alternator in which, when combined with turbomachinery, the magnetic thrust produced by the generator may be used to offset and balance the axial thrust produced by the turbomachinery.

Another object of the invention is to provide an improved inductor alternator in which the rotor comprises a single rotating disc, and in which there is a stationary return path for the magnetic flux.

A further object of the invention is to provide a turbo-inductor alternator in which the air gaps in the alternator are arranged to produce a magnetic thrust of sufficient intensity to counteract the opposite mechanical thrust produced by the turbomachine.

The above and other objects and features of the invention will be apparent from the following more detailed description and the accompanying drawings, in which:

FIG. 1 is a vertical sectional view of one form of compact inductor alternator embodying the principles of this invention;

FIGS. 2 and 3 are front views of the rotor and stator, respectively, shown in the FIG. 1 alternator;

FIGS. 4, 4A and 5 are fragmentary sectional views, largely diagrammatic, of slightly different forms of inductor alternators having modified air gaps and flux paths;

FIG. 6 is a vertical sectional view, similar to FIG. 1, showing an inductor alternator combined with a compressor wheel;

FIG. 7 is a front view of the rotor, the view being taken from the alternator side;

FIG. 8 is a rear view of the rotor, the view being taken from the compressor side;

FIG. 9 is a front view of a combined rotor and compressor wheel; and

FIG. 10 is a vertical sectional view taken along the line 10—10 of FIG. 9.

Inductor alternators differ from conventional power generators in several important respects. For example, the field and armature windings are both on the stator with the result that no brushes or sliding contacts are required. A single field coil carries direct current which magnetizes all the poles on one side with one polarity. The rotor is solid metal and has no winding. As the rotor poles move past the stator poles, the flux pulsation in the stator poles induces voltages in the stationary armature coils surrounding them. Flux linking any stator thus undulates from a maximum to a minimum value as the rotor rotates.

Several forms of compact axial air gap inductor alternators are shown in the accompanying drawings and all of them are adapted to be combined with turbomachinery. In FIGS. 1–5, however, some of the important features of the invention, as applied to the alternator itself, are illustrated alone. As shown in FIG. 1, an improved inductor alternator 11, constructed in accordance with the principles of this invention, may comprise a cylindrical housing member 12 which is secured by means of a suitable clamp 13 to the end of a transmission or gear housing 14. The gear housing may receive power from any suitable source, such as a gas turbine (not shown), for supplying the desired speed of rotation to a shaft 15. It will be apparent from FIG. 1 that the shaft 15 is actually a stub shaft and has no bearings or supports other than those that are provided in the gear housing or other associated machine 14. Said shaft 15 has a solid, high-strength, steel-bladed indicator rotor 16 mounted or formed on the end thereof for cooperative action with a stator 17 which is held within a frame 18, preferably nonmagnetic to the housing 12. Both housing 12 and frame 18 may be enclosed within a suitable casing 20, as illustrated.

Rotor 16 is preferably constructed from a single piece of solid, high-strength, magnetic steel and includes a hub 21 and a radially extending disc or body portion 22. The body portion has a plurality of integral teeth or blades 23 extending outwardly therefrom, as shown in FIG. 2, and adapted to form magnetic poles in a well-known manner. In this instance, four blades or poles 23 are provided, but the number will depend upon the frequency output desired from the inductor alternator. While a single blade or pole may be used, attention to balance usually dictates an even number. When four poles are used, they are spaced uniformly around the wheel 90 degrees apart, so as to provide uniformly shaped indentations or slots 24 between the individual poles. Stator 17, as best shown in FIGS. 1 and 3, comprises a heavy metal base plate or disc 25 having an axial hub 26 around which a stationary field coil 27 is wound. Obviously, the magneto motive force provided by the stationary field coil and hub structure could also be provided instead by a suitable magnet, either rotating or stationary. An armature 28 encircles the field coil 27 immediately adjacent the outer periphery thereof, and is composed of a plurality of laminated teeth 30 having conventional armature windings 31 wrapped about them. Alternating voltage is induced in the armature windings 31 by the change in flux density linking the armature conductors occasioned by the rapidly revolving magnetic poles of the inductor rotor, as is well known in the art.

Magnetic flux, induced by the field coil 27 wrapped around the axial portion 26 of the stator 17 and adjacent the face of the rotor 16, flows or passes in only one direction from the rotational axis of the stator to the circumferential portion of the blades in a generally radial direction. The magnetic material of the stator base plate 25 completes the magnetic flux path back to the rotor axis. It will thus be understood that the magnetic flux passed unidirectionally through two air gaps and through the stator and rotor in the paths and directions indicated in dotted lines in FIG. 1. Such flux paths are shorter and consequently more efficient than for conventional homopolar generators. The arrangement of the rotor and stator, as shown in FIG. 1, also permits the field coil to be highly efficient since it is practically buried in electrical steel and thus has a minimum of electrical resistance. In the FIG. 1 construction, it will be apparent that the magnetic force produced by the flux is in one direction only since it flows across the air gap between the rotor teeth 23 and the laminated teeth 30 of the stationary armature.

In FIG. 4, a slightly modified arrangement of the compact inductor alternator is illustrated schematically to show a modification in which the magnetic flux flows in two directions, i.e., both axially and radially, the design thus permitting control of the amount of magnetic force or thrust that may be directed across the air gaps in either or both of these directions. The two-directional flow is made possible by modifying the shape of the rotor, as will now be described. Thus, the modified alternator includes a rotor 40 having a hub 41 and a disc-like body 42 with a plurality of teeth 43. The rotor is also provided with an axial extension 44 around which an armature yoke 45 is placed for holding a stationary field coil 36. The yoke also forms the support for a plurality of armature laminations 47 which form the teeth of the armature and receive the usual windings 48. A nonmagnetic annular casing 50 may be provided around the outside of the armature coils 48, and a nonmagnetic shield 51 is arranged between the face of the field coil 46 and the adjacent face of the rotor disc 42, both to protect the field coil and reduce leakage. It will be apparent that in addition to the air gap between the teeth 43 of the rotor and the armature laminations 47, an air gap 52 is provided between the axial portion of the yoke 45 and the field coil 46 and the axial extension of the rotor 44.

Instead of having an axial air gap as shown in FIG. 1 or a radial and axial air gap as shown in FIG. 4, it is possible to have an axial air gap with a return air gap at some predetermined angle whereby the amount of magnetic thrust can be further regulated and controlled. One method of accomplishing this is shown in FIG. 4A where, by suitably shaping the axial extension 44 and armature yoke 45, an enlargement or balance ring 44a on the end of extension 44 and an angularly disposed or conical air gap 52a may be provided. Magnetic flux crossing this gap obviously has both radial and axial magnetic force components. Depending upon the angle of disposition of the gap 52a, the total thrust in either axial or radial direction may, within limits, be set at any desired level.

Another modification of the basic inductor alternator is shown in FIG. 5 where the arrangement is designed so that the magnetic thrust or forces produced are balanced. As indicated, this modified alternator comprises a rotor 55 with two spaced rotor discs 56 and 57 having spaced rotor teeth 58 and 59, respectively, so as to provide a space 60 in which a stator 61 may be arranged, all within a suitable nonmagnetic housing 62. Stator 61 is symmetrical in its arrangement and includes an iron or steel centrally disposed armature yoke 63 with the usual laminated armature teeth 64 on each side thereof, as illustrated. Armature coils 65 are wrapped or wound around the teeth 64, and along with the armature yoke 63 provide an axial space for the reception of a field coil 66 which may be connected to a suitable source of field current by a conductor 67 which extends from the field coil through the armature yoke 63 and casing 62. In order to dissipate the heat generated during the operation of the inductor alternator, the yoke 63 is so shaped as to provide suitable spaces 68 on either side thereof. These spaces may be lined or walled, preferably with a nonmagnetic material 70, thus providing passages through which a cooling fluid may be circulated. With the double disc rotor 56 and 57, teeth 58 and 59, and the symmetrical arrangement of the armature-stator, as illustrated and described, it will be apparent that the magnetic force or thrust in the gap between each rotor disc and the adpacent armature coil may be of equal intensity in opposite directions so as to compensate and balance any thrust on the rotor shaft.

It has been mentioned above that one of the principal objects of the present invention is to provide a compact and efficient inductor alternator which is particularly adapted for combination or integration with turbomachinery. The constructions, which have been described above and are shown in FIGS. 1–5, obviously lend themselves well to such combination and integration. In FIGS. 6–10, two different constructions, in which the inductor rotor has been integrated with a turbocompressor, are shown and these will now be described.

As shown in FIGS. 6, 7 and 8, a turboinductor alternator, which is generally designated by the reference numeral 75, may comprise an inductor alternator section 76 and a turbo-compressor section 77. The inductor alternator 76 is similar in its general configuration to the form shown in FIG. 1 and includes an axial shaft 78 having a disc-shaped rotor 80 mounted on the end thereof and suitable bearings 81 which separate said shaft from a stator-armature 82. Stator 82 includes the usual field coil 83, which again is arranged in wrap-around relation to the shaft, and a plurality of armature laminations 84, which are shaped with the usual teeth having suitable coils 85 wrapped around them in the conventional manner, as described above.

Rotor 80 is formed with a plurality of poles or teeth 86, as shown in FIG. 7. In this instance, however, the spaces between the poles 86 are filled with nonmagnetic material 87 so as to provide a continuous and uninterrupted periphery 88 on the rotor. Such an uninterrupted periphery provides a bearing surface for a suitable labyrinth seal 90 which seals the inductor alternator 76 from the compressor 77. While it may be considered desirable to have the seal 90 located as shown so as to separate the entire alternator from the compressor, there may be applications where such complete separation is unnecessary. Then the seal 90 might be located on the shaft 78 adjacent the rotor 80.

Compressor 77, in the form shown, is a one-stage compressor having a substantially conical-shaped wheel 91, which is welded or otherwise permanently attached to the rotor 80, and has a plurality of blades 92 formed thereon and arranged to receive air from an inlet 93. The inlet 93 is centrally disposed with respect to the axis of shaft 78, and is formed in and as part of a housing 94 which also includes an annular, tubelike chamber 95 having an outlet 96 connected thereto. The housing 94 may be attached to a cylindrical casing 97 provided on the inductor alternator, said casing 97 and housing 94 forming a support for the labyrinth seal 90, as shown in FIG. 6. In FIG. 8, it is indicated that the compressor wheel 91 has eight blades 92, but it will be understood that this is merely for purposes of illustration and any desired number of blades may be provided.

As described above, the base of the compressor wheel 91 is welded to the base of the rotor 80 of the inductor alternator and thus effectively integrates these two units of the apparatus. In FIGS. 9 and 10, however, a combined compressor wheel and inductor alternator rotor 100 is shown made or formed as a single unitary structure; i.e., the inductor alternator rotor is not welded or secured to the compressor wheel as shown in FIG. 6. Unitary rotor 100 comprises a disclike base and wheel portion 101 having a plurality of radially extending poles 102 similar to the poles 86 shown in FIG. 7. The combined wheel 100 also includes a somewhat extended axial hub 103 having a plurality of compressor blades 104 formed thereon. As in the FIGS. 7 and 8 construction, the spaces between the teeth 102 of the rotor portion of the wheel may be filled with suitably shaped pieces 105 of nonmagnetic material. This nonmagnetic material may be welded to the wheel so as to provide an uninterrupted, circular periphery 106. It will be understood that this manner of filling in the openings between the rotor poles effectively reduces windage losses due to or caused by the high-speed rotation of the rotor during the operation of the inductor alternator in which it is included.

It will be understood that in the inductor alternator described above, the short axial length of the rotor will permit eliminating normal couplings and separate bearing supports. Where the alternator is driven by a turbine the bearings of a turbine drive may be used to support the overhanging rotor effectively. The somewhat larger diameter of the rotor than in normal inductor alternators is advantageous and effective in maintaining speed with load change because inertia is relatively large. It will also be understood that the simplicity of the construction will permit an ease of assembly and disassambly. Furthermore, when combined with a compressor, as shown in FIGS. 6–10, the compressor air acts to cool the generator during operation.

I claim:

1. A compact inductor alternator comprising:
 (a) a stator including a stationary metal support, an annular armature mounted on said support, said armature having a plurality of circumferentially spaced laminated teeth projecting away from the face of said support, and an armature coil wound around and between said teeth in planes substantially parallel to the face of said support, and a field coil mounted on said support within the confines of said annular armature and in proximity to the center thereof; and
 (b) a rotor comprising a shaft extending through said field coil and armature, a one-piece metal disc disposed on the end of said shaft, said disc having one smooth face and a plurality of poles uniformly spaced around the periphery of said disc, and said disc and shaft being disposed to provide a narrow constant air gap between said smooth face and said armature during rotation of said disc, said stator and rotor being shaped so that at least a portion of said air gap is angularly disposed with respect to said shaft to direct the magnetic forces in a predetermined manner.

2. An inductor alternator comprising:
 (a) a stator having a stationary metal support with a central boss projecting from one face thereof, said support having an opening extending axially through said boss;
 (b) a field coil wound about said central boss in planes parallel to said face;
 (c) an annular laminated armature with a plurality of spaced teeth disposed around said central boss, the ends of said teeth providing a smooth surface in a predetermined location;
 (d) an armature coil wound about and between said teeth;
 (e) a rotor comprising an integral metal body rotatably supported with a smooth face portion thereon in close proximity to the surface provided by the ends of said teeth to form a first air gap, said body having a plurality of spaced poles at the periphery for movement past the spaced armature teeth; and
 (f) a boss on said rotor body extending through the opening in the boss on said support, the boss on said rotor body and the wall of the opening in said support being shaped to provide a second air gap having a different effective radial length than said first air gap on the opposite side of said support from said first air gap.

3. An inductor alternator comprising:
 (a) a stator having a stationary metal support with a central boss projecting from one face thereof, said support having an opening extending axially through said boss;
 (b) a field coil wound about said central boss in planes parallel to said face;
 (c) an annular laminated armature with a plurality of spaced teeth disposed around said central boss, the ends of said teeth providing a smooth surface in a predetermined location;
 (d) an armature coil wound about and between said teeth;
 (e) a rotor comprising an integral metal body rotatably supported with a smooth face portion thereon in close proximity to the surface provided by the ends of said teeeth to form a first air gap, said body having a plurality of spaced poles at the periphery for movement past the spaced armature teeth;
 (f) a boss on said rotor body extending through the opening in the boss on said support; and
 (g) a balance ring on the second-mentioned boss at the opposite side of said support from said rotor, adjacent surfaces of said support and balance ring providing a second air gap disposed at an angle less than 90 degrees to said first air gap.

4. An inductor alternator comprising:
 (a) a stator having a stationary metal support with a central boss projecting from one face thereof, said support having an opening extending axially through said boss;
 (b) a field coil wound about said central boss in planes parallel to said face;
 (c) an annular laminated armature with a plurality of spaced teeth disposed around said central boss, the ends of said teeth providing a smooth surface in a predetermined location;
 (d) an armature coil wound about and between said teeth;
 (e) a rotor comprising an integral metal body rotatably supported with a smooth face portion thereon in close proximity to the surface provided by the ends of said teeth to form a first air gap, said body having a plurality of spaced poles at the periphery for movement past the spaced armature teeth; and (f) a boss on said rotor body extending through the opening in the boss on said support, the boss on said rotor body and the wall of the opening in said support being shaped to provide a second air gap disposed at an angle less than 90° to the first-mentioned air gap.

References Cited by the Examiner
UNITED STATES PATENTS

| | | | |
|---|---|---|---|
| 579,012 | 3/1897 | Scheeffer | 310—168 |
| 678,646 | 7/1901 | Danielson | 310—168 |
| 1,184,805 | 5/1916 | Wright | 310—168 |
| 2,683,232 | 7/1954 | Weissheimer | 310—268 |

MILTON O. HIRSHFIELD, *Primary Examiner.*

L. L. SMITH, *Assistant Examiner.*